US008588742B2

(12) United States Patent
Oswal et al.

(10) Patent No.: US 8,588,742 B2
(45) Date of Patent: Nov. 19, 2013

(54) METHOD AND APPARATUS FOR PROVIDING WIRELESS SERVICES TO MOBILE SUBSCRIBERS USING EXISTING BROADBAND INFRASTRUCTURE

(75) Inventors: Anand K. Oswal, Sunnyvale, CA (US); Ramesh C. Yeevani, San Jose, CA (US); Ramanathan Lakshmikanthan, Milpitas, CA (US)

(73) Assignee: Ericsson AB, Stockholm (SE)

( * ) Notice: Subject to any disclaimer, the term of this patent is extended or adjusted under 35 U.S.C. 154(b) by 1508 days.

(21) Appl. No.: 11/725,125

(22) Filed: Mar. 16, 2007

(65) Prior Publication Data

US 2008/0229403 A1   Sep. 18, 2008

(51) Int. Cl.
*H04M 1/66* (2006.01)
(52) U.S. Cl.
USPC .......................... 455/411; 726/12; 370/395.52
(58) Field of Classification Search
USPC .................. 455/411, 426.1, 432.1; 726/12; 370/331, 335, 401, 390, 395.52, 395.3
See application file for complete search history.

(56) References Cited

U.S. PATENT DOCUMENTS

| 2005/0089025 A1* | 4/2005 | Boyer et al. ................... 370/352 |
| 2006/0009213 A1* | 1/2006 | Sturniolo et al. ........... 455/426.1 |
| 2006/0182061 A1* | 8/2006 | Naghian ....................... 370/331 |
| 2007/0160049 A1* | 7/2007 | Xie et al. ....................... 370/390 |
| 2008/0108321 A1* | 5/2008 | Taaghol et al. ............... 455/410 |
| 2008/0120700 A1* | 5/2008 | Pandey et al. ..................... 726/4 |

OTHER PUBLICATIONS

B. Aboba, "Extensible Authentication Protocol (EAP)", Network Working Group, Request for Comments: 3748, Obsoletes: 2284, Category: Standards Track, Microsoft, Jun. 2004, 63pp.
R. Droms, "Dynamic Host Configuration Protocol", Network Working Group, Request for Comments: 2131, Obsoletes: 1541, Category: Standards Track, Bucknell University, Mar. 1997, 43pp.

* cited by examiner

*Primary Examiner* — Charles Appiah
*Assistant Examiner* — Alexander Yi
(74) *Attorney, Agent, or Firm* — Blakely, Sokoloff, Taylor & Zafman LLP

(57) ABSTRACT

Techniques for providing wireless services to mobile subscribers using existing broadband network infrastructures are described herein. In one embodiment, in response to a request received at a gateway device from a mobile subscriber over a radio access network (RAN) for accessing a service provider network, the gateway device authenticates the mobile subscriber for accessing the RAN, where the gateway device interfaces the RAN and the existing broadband network. Upon successfully authenticating the mobile subscriber for accessing RAN, the gateway device accesses a network service provider over the existing network to acquire a network address on behalf of the mobile subscriber optionally using at least a portion of credentials derived from the authentication, where the network address allows the mobile subscriber to access the service provider network. Other methods and apparatuses are also described.

20 Claims, 4 Drawing Sheets

METHOD AND APPARATUS FOR PROVIDING WIRELESS SERVICES TO MOBILE SUBSCRIBERS USING EXISTING BROADBAND INFRASTRUCTURE

FIELD OF THE INVENTION

The present invention relates generally to broadband network communications. More particularly, this invention relates to providing wireless services to mobile subscribers using existing broadband infrastructure.

BACKGROUND

WiMAX (worldwide interoperability for microwave access) is a standard-based technology enabling the delivery of "last mile" wireless broadband access as an alternative to existing broadband such as cable and DSL (digital subscribed line). WiMAX provides fixed, nomadic, portable and mobile wireless broadband connectivity without the need for direct line-of-sight with a basestation. In a typical cell radius deployment of three to ten kilometers, WiMAX Forum Certified™ systems can be expected to deliver a capacity of up to 40 Mbps per channel, for fixed and portable access applications.

This is enough bandwidth to simultaneously support hundreds of businesses with T-1 speed connectivity and thousands of residences with DSL speed connectivity. Mobile network deployments are expected to provide up to 15 Mbps of capacity within a typical cell radius deployment of up to three kilometers. It is expected that WiMAX technology will be incorporated in portable computers and PDAs (portable digital assistants) in the near future, allowing for urban areas and cities to become "metro zones" for portable outdoor broadband wireless access. However, there has been a lack of efficient mechanisms to provide services to mobile subscribers using existing broadband network infrastructures.

SUMMARY OF THE DESCRIPTION

Techniques for providing services to mobile subscribers using existing broadband network infrastructures are described herein. In one embodiment, in response to a request received at a gateway device from a mobile subscriber over a radio access network (RAN) for accessing a service provider over an existing broadband network, the gateway device authenticates the mobile subscriber for accessing the RAN, where the gateway device interfaces the RAN and the existing broadband network. Upon successfully authenticating the mobile subscriber using authentication mechanism used in wireless networks, for accessing RAN, the gateway device accesses a network service provider over the existing broadband network to acquire a network address on behalf of the mobile subscriber using at least a portion of credentials derived from the authentication, where the network address allows the mobile subscriber to access the service provider over the existing broadband network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for providing services to mobile subscribers using existing broadband network infrastructures are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Today, customers would like to use their existing broadband (e.g., DSL or cable) wholesale back-end network to provide new "last mile" wireless (e.g., WiMAX, also referred to as IEEE 802.16) service to the end users (e.g., mobile subscribers). Typically, mobile CPE (customer premise equipment) or mobile stations may use, for example, EAP (extensible authentication protocol) to get authenticated in a radio access network (RAN, also referred to as an access service network or ASN) and then use, for example, DHCP (dynamic host configuration protocol) to acquire a network address such as an IP (Internet protocol) address in order to access the Internet/Intranet).

According to certain embodiments of the invention, a scheme is provided for WiMAX compliant CPE or mobile stations to obtain mobile wireless broadband access using the existing DSL whole sale backend network. Note that throughout this application, for the purpose of illustration only, WiMAX is used as an example of wireless technology to be used in conjunction of existing (e.g., wired) broadband technologies. However, it is not so limited, other wireless technologies, such as, for example, GSM (global system for mobile communications), CDMA (code division multiplex access), UMTS (universal mobile telecommunications system), etc., may also be applied.

Figure 1:
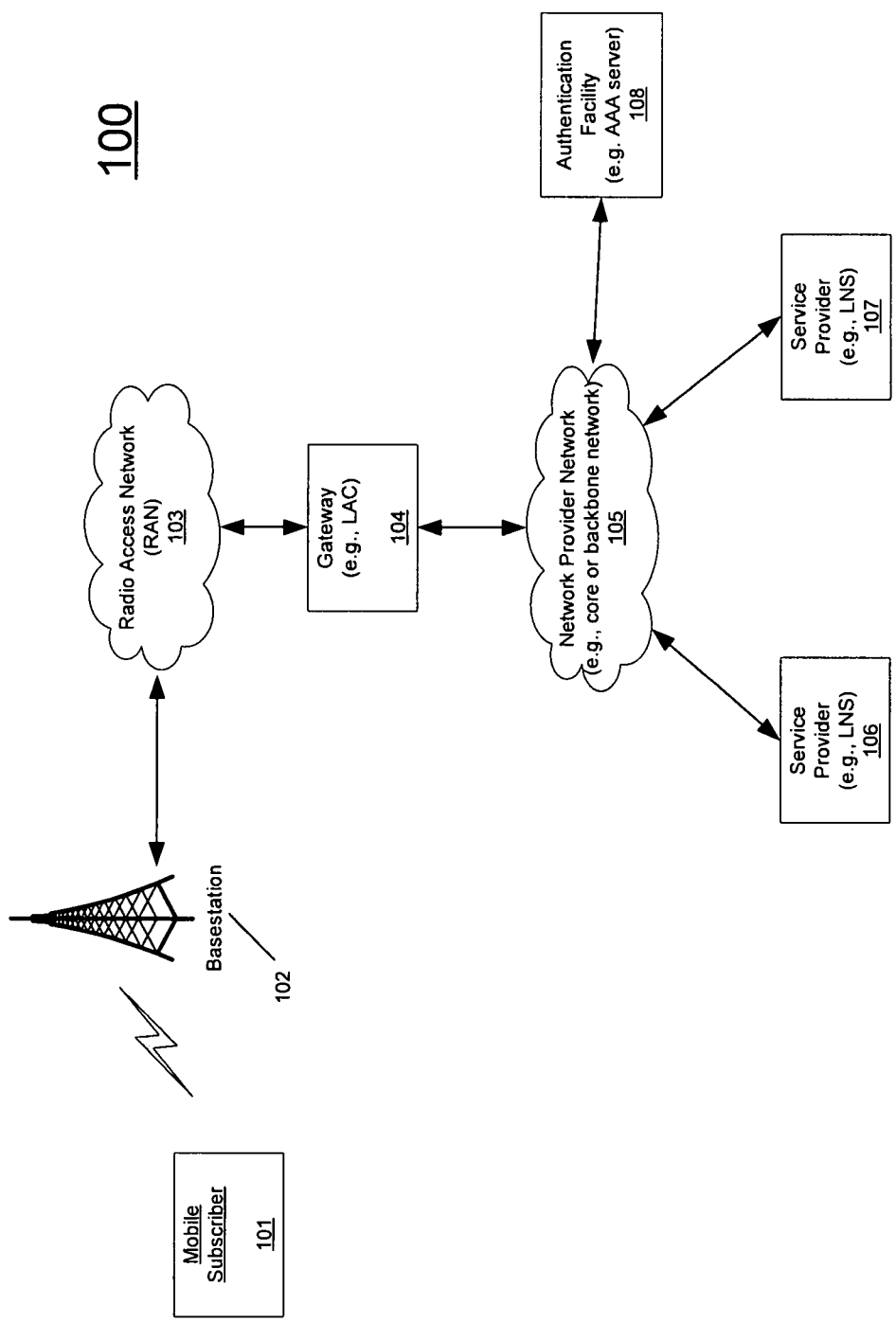
FIG. 1 is a block diagram illustrating an example of network configuration according to one embodiment of the invention.

FIG. 1 is a block diagram illustrating an example of network configuration according to one embodiment of the invention. Referring to FIG. 1, network configuration 100 includes, but is not limited to, a mobile subscriber 101 communicatively coupled to a gateway device 104 (also referred to as a network element) via basestation 102 and RAN 103, where gateway device 104 is configured to interface RAN 103 with a network provider network 105 (also referred to as a core network or core service network). Gateway device 104 enables mobile subscriber 101 to access the radio access network using a mechanism such as EAP. Authentication facility 108 may be implemented as part of an AAA (authentication, authority, and accounting) server, RADIUS (remote authentication dial in user service) server, IMS (IP multimedia subsystem) server or DIAMETER server. Service providers 106-107 may provide services for mobile a subscriber 101 to access service provider networks, such as the Internet using the existing wireline broadband authentication techniques.

Mobile subscriber 101 may be a portable device that is capable of wirelessly communicating with another communication device. For example, mobile subscriber 101 may be a WiMAX compliant device (e.g., a computing device or a laptop computer having WiMAX capabilities), while basestation 102 may be a WiMAX compliant communication tower. Alternatively, mobile subscriber 101 may be a cellular phone while basestation 102 may be a cellular tower, using a variety of cellular communication technologies, such as, for example, GSM or CDMA, etc. Other mobile devices using other wireless technologies (e.g., UMTS) may also be applied.

RAN 103 is part of a mobile telecommunication system. RAN 103 may reside between a mobile device (e.g., mobile subscriber 101) and a core network (CN) (e.g., network 105). Gateway device 104 may be an L2TP (layer 2 tunneling protocol) access concentrator (LAC) or BRAS (broadband remote aggregation server), such as, for example, a Smart-Edge™ router available from Redback Networks of San Jose, Calif. Alternatively, gateway device 104 may be an ASN (access service network) gateway device.

Service providers 106-107 may include one or more servers operated by one or more service providers to provide services to one or more subscribers in order to access one or more service provider networks (e.g., Internet). For example, service providers 106-107 may include an LNS (L2TP network server) owned or operated by a service provider. Note that gateway device 104 and LNS 106-107 may be owned or operated by the same entity or different entities. Optionally, authentication facility 108 may be an AAA (authentication, authorization, and accounting) server for authenticating mobile subscriber 101 when entering RAN 103 and/or network 105. In addition, service providers 106/107 may have their own AAA servers (not shown) for authentication.

According to certain embodiments of the invention, when mobile subscriber 101 desires to enter RAN 104, mobile subscriber 101 undergoes initial radio network entry and connects to basestation 102. Basestation 102 then communicates with gateway device 104 over RAN 103 regarding a new mobile subscriber entering the RAN 103. In response, gateway device 104 initiates an authentication process with mobile subscriber 101 by either using authentication information stored locally or invoking an authentication facility 108 to perform such authentication in a pass through mode. In one embodiment, EAP protocol is used during the authentication process.

Once mobile subscriber 101 has been successfully authenticated, mobile subscriber 101 may initiate a request for acquiring a network address (e.g., IP address) using a protocol such as DHCP, Mobile IP (MIP), etc. In response to the request, on behalf of mobile subscriber 101, gateway device 104 initiates a communication session (e.g., a PPP session) with an service provider to acquire the network address, in this example, one of the service providers 106-107 which may be implemented as an LNS server. Once successfully acquiring the network address from the address/service provider, gateway device 104 returns the acquired network address to mobile subscriber 101 in order to enable mobile subscriber 101 to access the corresponding service provider and a service provider network (e.g., Internet).

In a particular embodiment, after being successfully authenticated, mobile subscriber 101 initiates with gateway device 104 to acquire the network address using DHCP protocol. In response, gateway device 104 initiates a PPP session with an LNS (e.g., LNS 106-107), on behalf of the mobile subscriber 101. A DHCP packet may include user agent information that may be used to select the appropriate ISP 106/107. A user agent information may be included in DHCP Option 82 extensions. For example, it can include a domain name such as abc.com, etc.

In one embodiment, gateway device 104 may utilize local authentication information or the information (e.g., identity and/or password) obtained from a result of the authentication, such as, for example, EAP NAI (network address identifier) of an access accept response of EAP, to determine which ISP domain to be used for the PPP session. EAP success message from a AAA server may include the domain name to which the user belongs. Using this domain name (e.g., abc.com), gateway device can initiate a PPP session to the appropriate LNS server in service provider 106/107. In addition, dependent upon capabilities of the selected LNS server, gateway device 104 may use PPP-EAP authentication method which requires a new EAP authentication negotiation between mobile subscriber 101 and the selected LNS. Once the gateway device 104 obtains an IP address on behalf of mobile subscriber 101 as part of the PPP negotiation, gateway device 104 returns the IP address to mobile subscriber 101 using the same or similar protocol that the subscriber used to request for IP address (e.g., DHCP or Mobile IP) and establishes a forwarding path to allow mobile subscriber 101 to access the selected LNS server using the acquired IP address. In one embodiment, gateway device 104 acts as a DHCP/PPP proxy between mobile subscriber 101 and LNS 106-107. That is, gateway device 104 may operate as a DHCP Proxy server to mobile subscriber 101 and operate a DHCP/PPP client to LNS 106-107. Other configurations may exist.

Figure 2:
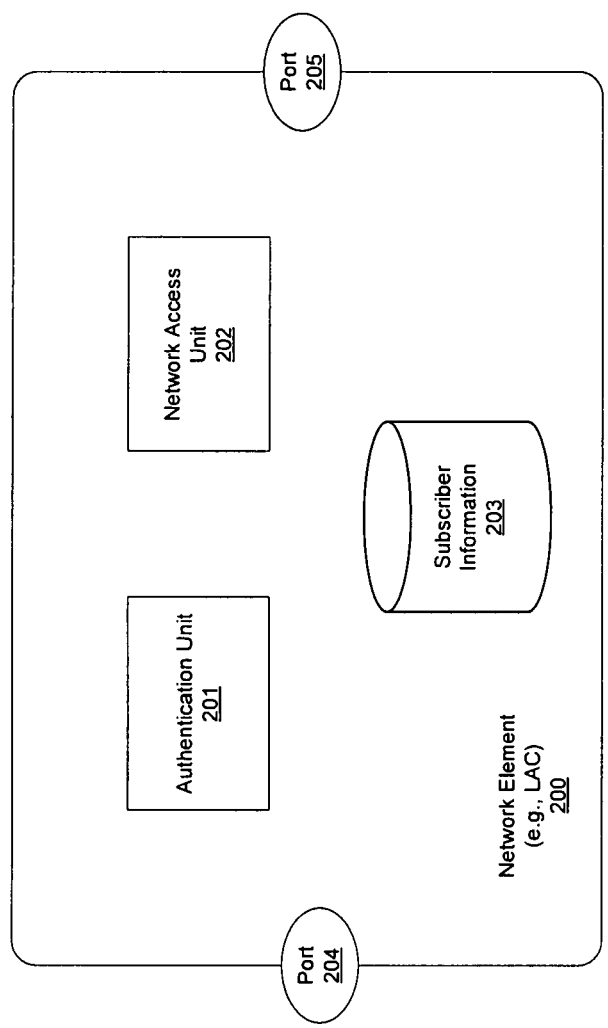
FIG. 2 is a block diagram illustrating an example of a network element which may be used as one embodiment of the invention.

FIG. 2 is a block diagram illustrating an example of a network element which may be used as one embodiment of the invention. For example, network element 200 may be implemented as part of gateway device 104 of FIG. 1. Referring to FIG. 2, according to one embodiment, network element 200 includes, but is not limited to, an authentication unit 201, a network access unit 202, and a subscriber information base 203 (optional). Network element 200 further includes one or more ports or interfaces 204-205 for interfacing external network connections. Ports 204-205 may be considered as ingress ports or egress ports dependent upon directions of the network traffics. For example, for the purpose of illustration, port 204 may be coupled to a RAN such as RAN 103 of FIG. 1 while port 205 may be coupled to a core network such as network 105 of FIG. 1.

In one embodiment, authentication unit 201 is configured to authenticate a mobile subscriber when the mobile subscriber enters the RAN, for example, using EAP protocol as described above. In one embodiment, authentication unit 201 may use authentication information stored in the information base 203, where the storage 203 may be maintained locally or remotely. Alternatively, authentication unit 201 may invoke an external authentication facility (e.g., AAA server) to authenticate the mobile subscriber. Upon successfully authenticating a mobile subscriber, network access unit 202 is configured to acquire a network address (e.g., IP address) for the mobile subscriber from a network address provider or service provider, and to establish a network access path to allow the mobile subscriber to access the service provider over the existing wired broadband network as described above. Note that some or all of the components of network element 200 may be implemented in hardware, software, or a combination of both.

Figure 3:
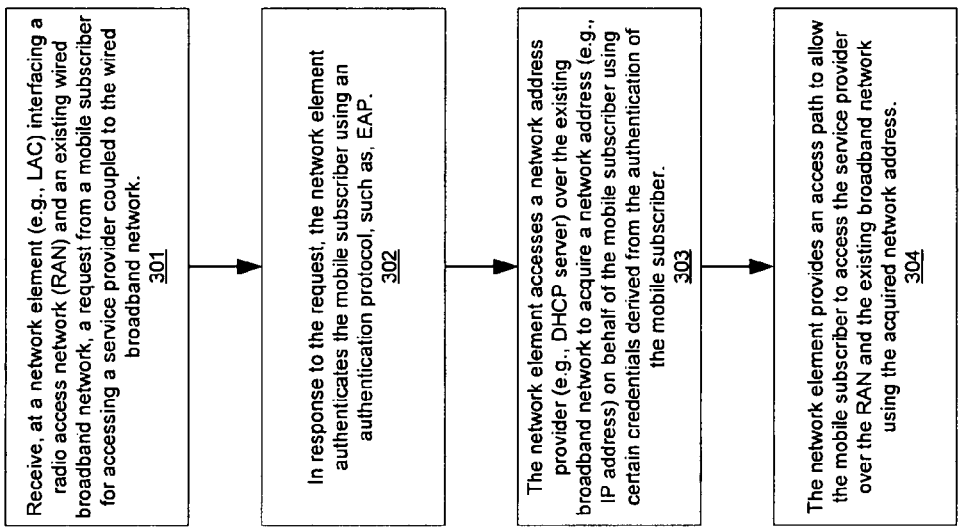
FIG. 3 is a flow diagram illustrating an example of a process according to one embodiment of the invention.

FIG. 3 is a flow diagram illustrating an example of a process according to one embodiment of the invention. Process 300 may be performed by processing logic which may comprise hardware, software, or a combination of both. For example, process 300 may be performed by network element 200 of FIG. 2. Referring to FIG. 3, according to one embodiment, at block 301, a request is received at a network element from a mobile subscriber for accessing a service provider of an existing broadband network. The network element interfaces an RAN with the existing wired broadband network. In response to the request, at block 302, the network element authenticates the mobile subscriber using an authentication protocol such as EAP, locally or by invoking an external authentication facility (e.g., AAA facility). Upon successfully authenticating the mobile subscriber, at block 303, the network element accesses a network address provider or service provider to acquire a network address (e.g., IP address) on behalf of the mobile subscriber, optionally using at least a portion of credentials obtained from the authentication. Once the network address has been acquired, at block 304, the network element establishes an access path for the mobile subscriber to allow the mobile subscriber to access the service providers network using the acquired network address. Other operations may also be performed.

Figure 4:
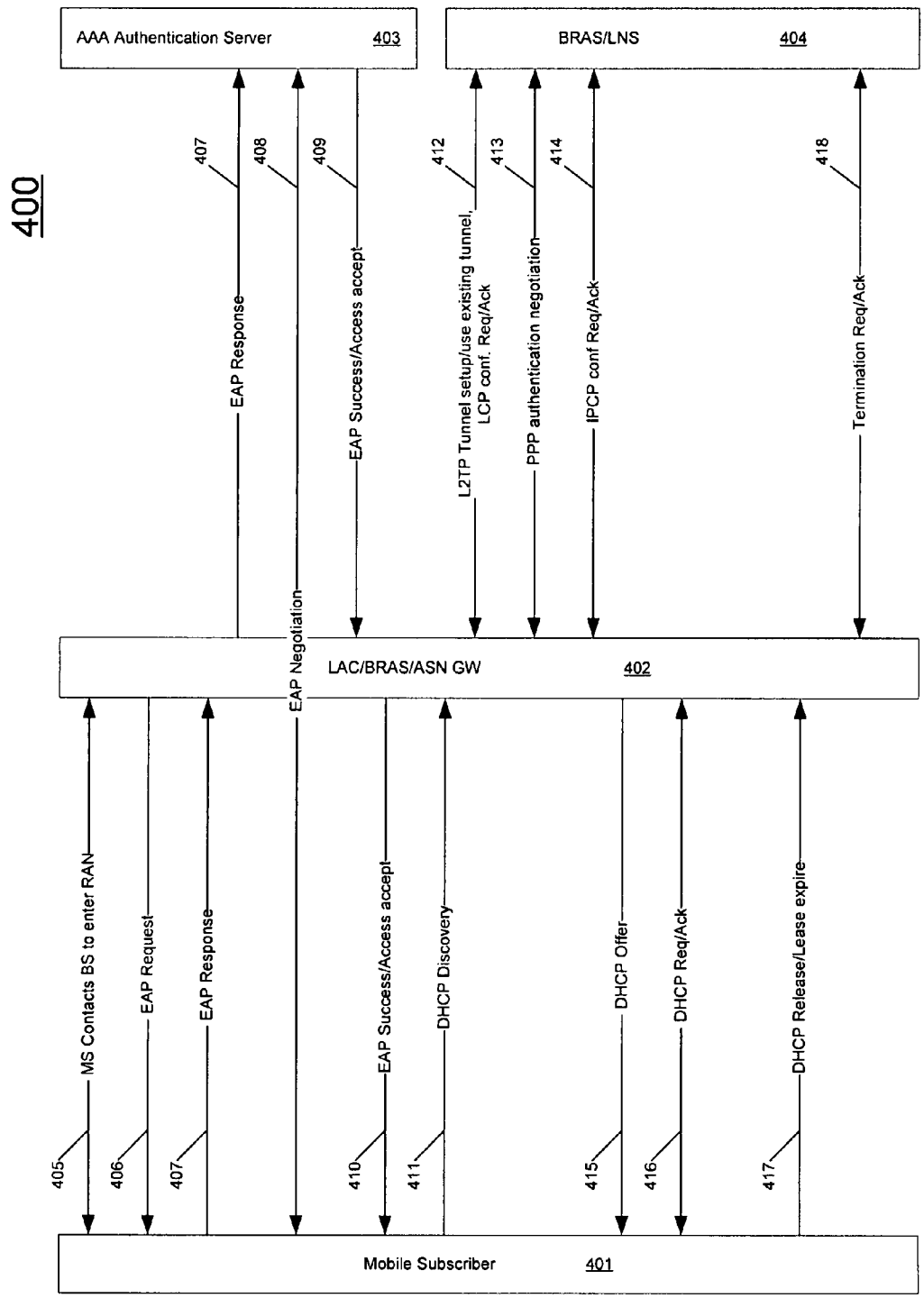
FIG. 4 is a flow diagram illustrating a process for providing services to mobile subscribers according to another embodiment of the invention.

FIG. 4 is a flow diagram illustrating a process for providing services to mobile subscribers according to another embodiment of the invention. Note that process 400 may be performed by processing logic which may comprise hardware, software, or a combination of both. For example, mobile subscriber 401 may be implemented as part of mobile subscriber 101 of FIG. 1. Gateway device 402 may be implemented as part of gateway device 104 of FIG. 1. Authentication facility 403 may be implemented as part of authentication facility 108 of FIG. 1. LNS 404 may be implemented as part of any of LNS 106-107 of FIG. 1.

Referring back to FIG. 4, process 400 is performed among mobile subscriber 401, a gateway device 402, authentication facility 403, and an LNS 404. In one embodiment, during operation 405, mobile subscriber 401 may access RAN via a basestation (not shown). The basestation may notify gateway device 402 regarding mobile subscriber 401 entering the RAN. In response, during operation 406, gateway device 402 initiates an authentication session to mobile subscriber 401, for example, via an EAP request. In response to an EAP response received from mobile subscriber 401 during operation 406, gateway device may operate as an authentication server or alternatively in this example, as a pass-through device to pass the EAP response to authentication facility 403 during operation 407. Thereafter, during operation 409, mobile subscriber 401 and authentication facility 403 perform authentication negotiation during operation 408. For example, mobile subscriber 401 and authentication facility 403 may exchange certain authentication information or parameters such as NAI (network address identifier).

Once the mobile subscriber 401 has been successfully authenticated by authentication facility 403, gateway device 402 receives an EAP success/access accept message during operation 409 and gateway device 402 may relay the EAP success/access accept message back to mobile subscriber 401 during operation 410. In addition, gateway device 402 may extract certain credentials (e.g., identity, domain name or password) associated with the mobile subscriber 401 from the EAP success/access accept message, which may be used in a subsequent network access authentication process (e.g., DHCP negotiation).

At this point, mobile subscriber 401 has been authenticated to access the RAN. However, mobile subscriber 401 still needs to acquire an IP address in order to access an IP network (e.g., service providers network). As a result, during operation 411, mobile subscriber 401 sends (via a basestation) a DHCP discovery message to gateway device 402 for acquiring an IP address. When gateway device 402 receives the DHCP discovery packet, according to one embodiment, based on certain information obtained from a result of the authentication processes performed during operations 405-410 (e.g., certain attributes from EAP success/access accept message), gateway device 402 may assign an IP address to mobile subscriber using information stored locally. In this situation, gateway device 402 may operate as a DHCP server. Alternatively, gateway device 402 may invoke an external server such as LNS 404 to complete the process of acquiring IP address for mobile subscriber using a protocol such as PPP. In this situation, gateway device 402 may operate as a DHCP proxy/server and reply to the mobile subscriber using DHCP offer with the same IP address obtained during the PPP negotiation.

In some situations, gateway device 402 may not be operated or owned by the service provider to which the mobile subscriber 401 is attempting to reach. Thus, according to one embodiment, a result of authentication message (e.g., EAP success/access accept message) received during operation 409 may include certain information about the mobile subscriber 401, which may be used in subsequent operations performed by the gateway device 402. For example, the EAP success or EAP success/access accept message may include an attribute that indicates where (e.g., service provider domain) the gateway device 402 should forward a request for acquiring an IP address, etc. In this example, the gateway device 402 may have to forward the request to a service provider domain that may only support PPP termination with LNS service. Thus, gateway device 402 may have to mediate between DHCP and PPP accesses by proxying as a DHCP server to mobile subscriber 401 and a PPP client to the LNS server.

During operation 411, when gateway device 402 receives a DHCP discovery message from mobile subscriber 401, gateway device 402 establishes a PPP session (e.g., L2TP tunnel using LCP or link control protocol) with a proper LNS server associated with the service provider. Thereafter, gateway device 402 may perform a PPP negotiation with LNS 404 on behalf of mobile subscriber 401 in an attempt to acquire an IP address, during operations 412-414. In this situation, gateway device 402 may have to initiate a PPP session (e.g., as a PPP proxy) with LNS 404 on behalf of mobile subscriber 401, which may be implementation specific.

In addition, gateway device 402 may have to authenticate mobile subscriber 401 to LNS 404, which may be implemented in several ways according to certain embodiments of the invention. When gateway device 402 receives EAP success/access accept message, gateway device 402 may capture an identity of mobile subscriber 401 while relaying the EAP messages; however, gateway device 402 may not have enough information to capture a password of mobile subscriber 401. According to one embodiment, the password may be obtained as a part of an attribute of the EAP success/access accept message. Gateway device 402 may use this attribute as a password in the subsequent PPP authentication phase (e.g., operations 412-414). In some cases, the RAN providers and service providers (e.g., ISP) may not be the same. Hence, authentication information must be synchronized amongst multiple authentication entities.

According to an alternative embodiment, gateway device 402 may utilize a "default" password in the PPP authentication phase. That is, gateway device 402 may only maintain a limited number of passwords or a single "default" password for all mobile subscribers including mobile subscriber 401. As a result, gateway device 402 does not have to maintain a large database or complex infrastructure to store password or other information for numerous mobile subscribers. LNS 404 in the target domain may choose to accept such credentials of mobile subscriber 401 with limited access to the network (e.g., service provider network such as Internet). Alternatively, LNS 404 may impose a policy to redirect mobile subscriber 401 to an authentication portal for further authentication before allowing mobile subscriber 401 to have full network accesses. This further authentication phase may be performed after mobile subscriber 401 acquires the IP address through DHCP negotiation.

According to another embodiment, as suggested above, gateway device 402 may maintain a database locally for the purpose of maintaining credentials of mobile subscribers. Alternatively, the database may be maintained remotely, for example, by a third party using AAA services. According to a further embodiment, if LNS 404 supports PPP-EAP based authentication, gateway device 402 may operate as a pass-through EAP relay between mobile subscriber 401 and LNS 404. Other configurations may exist.

Specifically, referring back to FIG. 4, during operation 412, gateway device 402 initiates a PPP-LCP (PPP/link control protocol) request on behalf of mobile subscriber 401 to LNS 404 in a target domain. Gateway device 402 may have received a domain name or LNS server address as part of the EAP success/access accept message. Gateway device 402 may use any type of authentication methods mentioned above in a PPP challenge/response authentication phase during operation 413. Upon a successful PPP authentication, during operation 414, gateway device 402 proceeds with an IPCP (IP control protocol) negotiation. During this IPCP negotiation, gateway device receives an IP address and other network related information that mobile subscriber 401 may use.

Once the gateway device 402 obtains an IP address from LNS 404, gateway device 402 transmits a DHCP offer, as a response to a DHCP discovery message (received during operation 411), to mobile subscriber 401 during operation 415. In one embodiment, if the gateway device 402 fails to establish a PPP session with the target domain server (e.g., LNS 404) due to an authentication failure during operations 412-414, gateway device 402 may discard the DHCP discovery message received in operation 411.

If mobile subscriber 401 responds with a DHCP REQ message, during operation 416, gateway device 402 may respond with a DHCP ACK message. At this point, mobile subscriber 401 is fully provisioned to access the service provider network in target domain (e.g., LNS 404). If for some reasons mobile subscriber 401 decided not to respond with a DHCP REQ message in response to the DHCP offer within a predetermined period of time, gateway device 402 may terminate the corresponding PPP session with LNS 404 by sending a termination REQ message to LNS 404 during operation 418.

According to DHCP protocol standards, mobile subscriber 401 is required to renew the lease during a certain period of time indicated by the DHCP ACK message. If mobile subscriber 401 decided to terminate the session, mobile subscriber 401 may send a DHCP release message to gateway device 402 which in turn terminates the corresponding PPP session with LNS 404 by sending a termination REQ message (e.g., operation 418). If mobile subscriber 401 does not renew the lease and the lease time expires, gateway device 402 may send the same termination REQ message to LNS 404 (e.g., operation 418). Other operations may also be performed.

Thus, techniques for providing services to mobile subscribers using existing broadband network infrastructures have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing services to mobile subscribers, the method comprising: in response to a request received at a gateway device from a mobile subscriber over a radio access network (RAN) for accessing a service provider over an existing broadband network, the gateway device authenticating, using Extensible Authentication Protocol (EAP), the mobile subscriber for accessing the RAN, the gateway device interfacing the RAN and the existing broadband network; upon successfully authenticating the mobile subscriber for accessing the RAN, the gateway device acquiring, on behalf of the mobile subscriber, a network address to be assigned to the mobile subscriber, the network address allowing the mobile subscriber to access the service provider over the existing broadband network, wherein acquiring the network address on behalf of the mobile subscriber comprises: receiving at the gateway device a Dynamic Host Configuration Protocol (DHCP) discovery request from the mobile subscriber, establishing a Layer 2 Tunneling Protocol (L2TP) tunnel with an L2TP Network Server (LNS) associated with the service provider, establishing a Point-to-Point Protocol (PPP) session with the service provider using the L2TP tunnel, initiating an IP (Internet Protocol) control protocol (IPCP) negotiation with the service provider through the PPP session, and receiving the network address from the service provider from the IPCP negotiation; and transmitting a DHCP offer message to the mobile subscriber, wherein the DHCP offer message includes the network address, wherein the gateway device determines which service provider domain is to be used for the PPP session based upon at least one of an identity of the mobile subscriber and a password associated with the mobile subscriber obtained from the authentication.

2. The method of claim 1, wherein the gateway device operates as an authentication server to authenticate the mobile subscriber using authentication information stored locally.

3. The method of claim 1, wherein the gateway device invokes an AAA (authentication, authorization, and accounting) facility to authenticate the mobile subscriber.

4. The method of claim 1, further comprising extracting at least a portion of credentials from a result of successful authentication, including the identity of the mobile subscriber and the password associated with the mobile subscriber, wherein the identity and password of the mobile subscriber are used to acquire the network address.

5. The method of claim 4, further comprising identifying the service provider from a plurality of service providers based on the extracted credentials from the successful authentication.

6. The method of claim 1, wherein the existing broadband network comprises an existing DSL (digital subscriber line) network, wherein the mobile subscriber is a WiMAX (worldwide interoperability for microwave access) compliant client, and wherein the request is received by the gateway device via a WiMAX basestation.

7. A non-transitory machine-readable storage medium having instructions stored therein, which when executed by a processor, cause the processor to perform a method for providing services to mobile subscribers, the method comprising: in response to a request received at a gateway device from a mobile subscriber over a radio access network (RAN) for accessing a service provider over an existing broadband network, the gateway device authenticating, using Extensible Authentication Protocol (EAP), the mobile subscriber for accessing the RAN, the gateway device interfacing the RAN and the existing broadband network; and upon successfully authenticating the mobile subscriber for accessing the RAN, the gateway device acquiring, on behalf of the mobile subscriber, a network address to be assigned to the mobile subscriber, the network address allowing the mobile subscriber to access the service provider over the existing broadband network, wherein acquiring the network address comprises: receiving at the gateway device a Dynamic Host Configuration Protocol (DHCP) discovery request from the mobile subscriber, establishing a Layer 2 Tunneling Protocol (L2TP) tunnel with an L2TP Network Server (LNS) associated with the service provider, establishing a Point-to-Point Protocol (PPP) session with the service provider using the L2TP tunnel, initiating an IP (Internet Protocol) control protocol (IPCP) negotiation with the service provider through the PPP session, and receiving the network address from the service provider from the IPCP negotiation; and transmitting a DHCP offer message to the mobile subscriber, wherein the DHCP offer message includes the network address, wherein the gateway device determines which service provider domain is to be used for the PPP session based upon at least one of an identity of the mobile subscriber and a password associated with the mobile subscriber obtained from the authentication.

8. The non-transitory machine-readable storage medium of claim 7, wherein the gateway device operates as an authentication server to authenticate the mobile subscriber using authentication information stored locally.

9. The non-transitory machine-readable storage medium of claim 7, wherein the gateway device invokes an AAA (authentication, authorization, and accounting) facility over the existing broadband network to authenticate the mobile subscriber.

10. The non-transitory machine-readable storage medium of claim 7, wherein the method further comprises extracting at least a portion of credentials from a result of successful authentication, including the identity of the mobile subscriber and the password associated with the mobile subscriber, wherein the identity and password of the mobile subscriber are used to acquire the network address.

11. The non-transitory machine-readable storage medium of claim 10, wherein the method further comprises identifying the service provider from a plurality of service providers based on the extracted credentials from the successful authentication.

12. The non-transitory machine-readable storage medium of claim 7, wherein the existing broadband network comprises an existing DSL (digital subscriber line) network, wherein the mobile subscriber is a WiMAX (worldwide interoperability for microwave access) compliant client, and wherein the request is received by the gateway device via a WiMAX basestation.

13. A network element for interfacing a radio access network (RAN) and an existing broadband network, the network element comprising: an authentication processing unit to authenticate, using Extensible Authentication Protocol (EAP), a mobile subscriber in response to a request received from the mobile subscriber over the RAN for accessing a service provider over the existing broadband network; and a network address processing unit coupled to the authentication processing unit, upon successfully authenticating the mobile subscriber for accessing the RAN, to acquire, on behalf of the mobile subscriber, a network address to be assigned to the mobile subscriber, the network address allowing the mobile subscriber to access the service provider over the existing broadband network, wherein the network address processing unit is to acquire the network address and then assign the network address by being configured to: receive a Dynamic Host Configuration Protocol (DHCP) discovery request from the mobile subscriber, establish a Layer 2 Tunneling Protocol (L2TP) tunnel with an L2TP Network Server (LNS) associated with the service provider, establish a Point-to-Point Protocol (PPP) session with the service provider using the L2TP tunnel, initiate an IP (Internet Protocol) control protocol (IPCP) negotiation with the service provider through the PPP session, receive the network address from the service provider from the IPCP negotiation, and transmit a DHCP offer message to the mobile subscriber, wherein the DHCP offer message includes the network address, wherein the network address processing unit is to determine which service provider domain is to be used for the PPP session based upon at least one of an identity of the mobile subscriber and a password associated with the mobile subscriber obtained from the authentication.

14. The network element of claim 13, further comprising storage for storing authentication information for a plurality of mobile subscribers, wherein the authentication processing unit operates as an authentication server to authenticate the mobile subscriber using authentication information stored in the storage.

15. The network element of claim 13, wherein the authentication processing unit invokes an AAA (authentication, authorization, and accounting) facility over the existing broadband network to authenticate the mobile subscriber.

16. The method of claim 1, wherein the acquiring the network address on behalf of the mobile subscriber further comprises using at least a portion of credentials derived from the authentication to acquire the network address on behalf of the mobile subscriber.

17. The non-transitory machine-readable storage medium of claim 7, wherein the acquiring the network address on behalf of the mobile subscriber further comprises using at least a portion of credentials derived from the authentication to acquire the network address on behalf of the mobile subscriber.

18. The network element of claim 13, wherein the network address processing unit is configured to acquire the network address using at least a portion of credentials derived from the authentication.

19. The network element of claim 13, wherein the network address processing unit is configured to extract at least a portion of credentials from a result of successful authentication, including the identity of the mobile subscriber and the password associated with the mobile subscriber, wherein the identity and password of the mobile subscriber are used to acquire the network address.

20. The network element of claim 19, wherein the network address processing unit is configured to identify the service provider from a plurality of service providers based on the extracted credentials from the successful authentication.

* * * * *

UNITED STATES PATENT AND TRADEMARK OFFICE
CERTIFICATE OF CORRECTION

| | | Page 1 of 1 |
|---|---|---|
| PATENT NO. | : 8,588,742 B2 | |
| APPLICATION NO. | : 11/725125 | |
| DATED | : November 19, 2013 | |
| INVENTOR(S) | : Oswal et al. | |

It is certified that error appears in the above-identified patent and that said Letters Patent is hereby corrected as shown below:

On the Title Page, in Item (74), under "Attorney, Agent, or Firm", in Column 2, Line 1, delete "Blakely, Sokoloff, Taylor" and insert -- Blakely Sokoloff Taylor --, therefor.

In the Specification:

In Column 1, Line 19, delete "subscribed" and insert -- subscriber --, therefor.

In Column 2, Line 54, delete "multiplex" and insert -- multiple --, therefor.

In Column 3, Line 5, delete "mobile a subscriber" and insert -- mobile subscriber --, therefor.

In Column 3, Line 43, delete "RAN 104," and insert -- RAN 103, --, therefor.

Signed and Sealed this
Twenty-second Day of July, 2014

Michelle K. Lee
*Deputy Director of the United States Patent and Trademark Office*